INVENTORS
WILLIAM STAECKER
& WILBUR H. KITTO
BY
Williams & Tilberry
ATTORNEYS

Feb. 11, 1958 W. STAECKER ET AL 2,822,696
SINGLE ACTION PRESS DRIVE
Filed Jan. 28, 1955 6 Sheets-Sheet 5

INVENTORS
WILLIAM STAECKER
& WILBUR H. KITTO
BY
ATTORNEYS

INVENTORS
WILLIAM STAECKER
& WILBUR H. KITTO
BY
Williams & Pilbury
ATTORNEYS

United States Patent Office 2,822,696
Patented Feb. 11, 1958

2,822,696

SINGLE ACTION PRESS DRIVE

William Staecker and Wilbur H. Kitto, Canton, Ohio, assignors to E. W. Bliss Company, Canton, Ohio, a corporation of Delaware Application January 28, 1955, Serial No. 484,789

14 Claims. (Cl. 74—44)

This invention relates to metal blanking and drawing mechanical type presses and more particularly to improvements in such presses of the underdriven type where the driving mechanism is largely in the bed of the press.

It is customary in mechanical press construction to power the driving mechanism from a side or end of the press whereby considerable torque is imparted to the gear supporting shafts. This is undesirable and results in what is sometimes referred to as "windup." That is to say, torque applied to the shafts actually twists them along their longitudinal axes due to the resistance of the load, resulting in loss of synchronization between cooperating parts, as for instance, two gears spaced apart on the shaft. In a four point press, where it is important that pressure be applied as evenly as possible to all four corners of the slide, even a slight "windup" may result in uneven load distribution on the slide with resulting imperfect registration and uneven loading of the dies. When this condition exists, not only are the work-pieces defective, but there is the danger of damaging the dies, if not the press itself. Accordingly, it is a principal object of this invention to provide a single action press having an improved balanced driving mechanism better than those heretofore known in which the undesirable effects of "windup" are minimized.

Once a mechanical press is designed to perform according to certain prescribed specifications, modification of this performance is not normally possible without completely redesigning the press. However, it is an object of the present invention to provide a mechanical underdriven press, the performance of which may be modified easily from press to press, or by rebuilding the one press, to give either a short or relatively long period of dwell at bottom dead center with different rates of acceleration for both the first and last halves of a cycle of operation, and modified tonnage capacities through the work portion of the stroke. It is also an object of the invention to provide a novel single action underdriven press which is more compact, rugged and serviceable than similar presses heretofore known. It is another object of the invention to provide a single action underdriven press which is simpler, has fewer parts and is easier and more economical to build and maintain than other presses for similar uses. It is still another object of the invention to provide an improved single action press requiring less head room than do presses of the conventional type. Still further objects and advantages will appear hereinafter and will become apparent from the following description of a preferred embodiment of the invention.

To the accomplishment of the foregoing and related ends, said invention, then, consists of the means hereinafter duly described and particularly pointed out in the claims, the annexed drawings and the following description setting forth in detail certain mechanism embodying the invention, such disclosed means constituting, however, but one of the various means in which the principle of the invention may be used.

In general, the objects set forth above are accomplished with a link type mechanical underdriven press of unique design in which all crankshafts and rock arms are driven as closely as possible from the center portions of these members, and the overall lengths of these members are kept to a minimum by positioning journal blocks as close as possible to points of initial torque.

Broadly speaking, the slide actuating mechanism is located in the bed and includes a pair of links extending vertically upward on opposite sides of the press connected at their upper ends to the slide to provide a four point drive, and at their lower ends to rockshafts adapted to impart reciprocating motion to the links. Rockshafts extend from front to back on each side of the press and are journaled in the front and rear walls of the press bed. Each rockshaft carries a pair of links with their lower ends pivotally secured near a rockshaft journal bearing. A centrally disposed crank is provided integral with each rockshaft intermediate and equidistant from the links to provide a rocking movement to the shaft. This movement is imparted by a connecting rod extending form the rockshaft crank toward the center of the press along its longitudinal axis to a crankshaft near the center of the press. Each crankshaft has a bull gear on its outboard end and these bull gears are driven by a pair of pinions on the ends of an intermediate idler shaft. The idler shaft carries an idler gear in its center portion for engagement with a flywheel pinion also centrally disposed on a main drive shaft for driving engagement with the idler gear. The inboard ends of the crankshafts are journaled in bearing blocks intermediate the front and rear walls so as to provide rigidity at the crank portion of the shafts.

Figure 1:
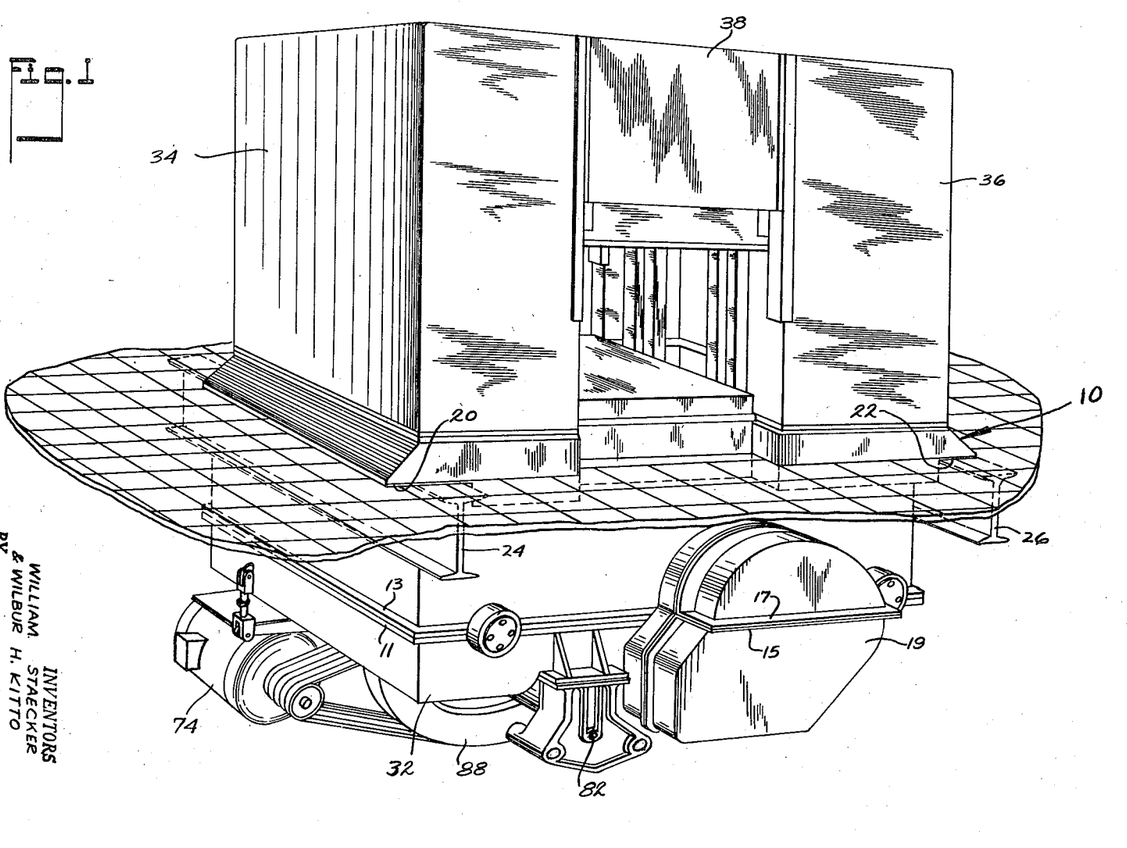
Figure 1 is a perspective view of a press embodying the preferred form of the invention.
Figure 7:
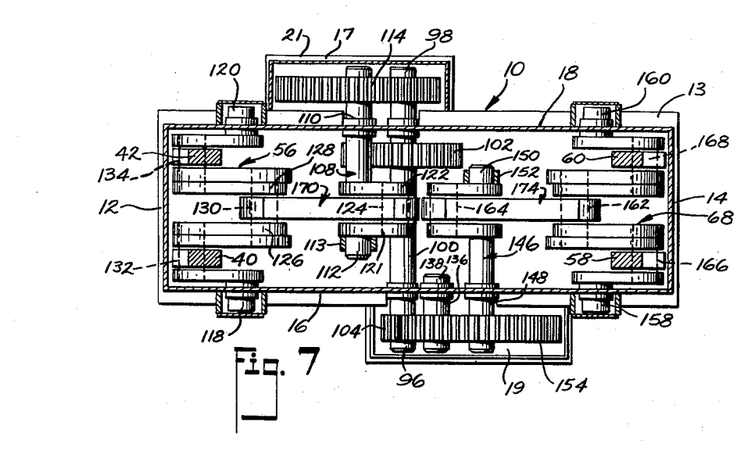
Figure 7 is a section taken on the line 7—7 of Figure 2.

Referring now more particularly to the drawings in which like numerals are used to identify like parts, the press will be seen to comprise a bed or base 10 (Figures 1, 2 and 7) having side walls 12 and 14 and front and rear walls 16 and 18 respectively (Figure 7). The side walls are provided with steps 20 and 22 (Figures 1 and 2) which rest on I beams 24 and 26 respectively to support the press at the floor line 28 of the press room. The portion of the base below the floor line is suspended in a pit 30 of ample depth to provide clearance for parts projecting downwardly below the oil pan which forms the bottom 32 joining the walls 12, 14, 16 and 18. With the exception of the motor 74 and the flywheel 88, all other parts of the underdrive are immersed and run in an oil bath contained in the oil pan comprising bottom 32, sides 12 and 14 and front and back walls 16 and 18, which are sealed together liquid tight along flanges 11 and 13 (Figure 2) of the side and end walls and along flanges 15 and 17 (Figure 3) of the bull gear covers 19 and 21. Oil seals 89 (Figure 3) on flywheel shaft 86 seal off the flywheel assembly and motor unit from the balance of the oil bath lubricated underdrive.

The base 10 is also adapted to support spaced uprights or side members 34 and 36 mounted on the base adjacent depending sides 12 and 14 respectively and a crown 38 (Figure 2) secured to the top ends of the spaced side members all for the purposes hereafter described.

Figure 3:
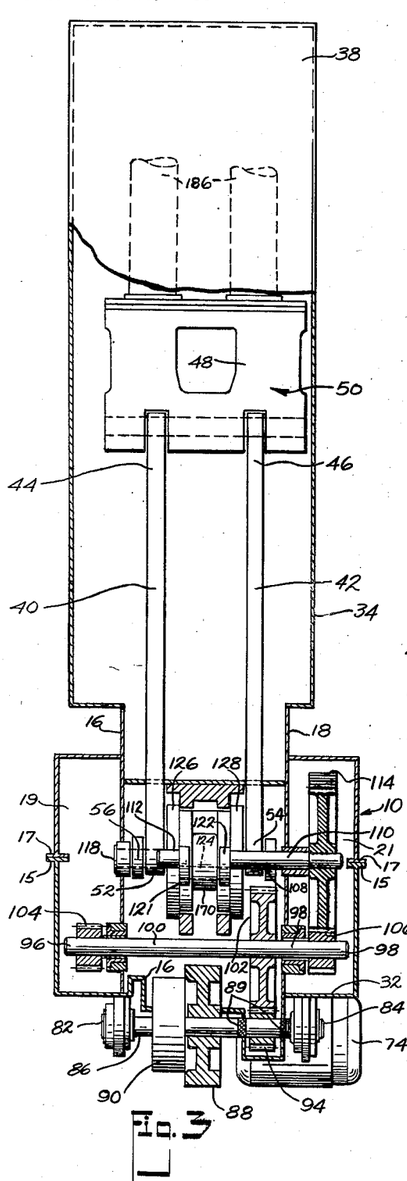
Figure 3 is section taken substantially along the line 3—3 of Figure 2.
Figure 4:
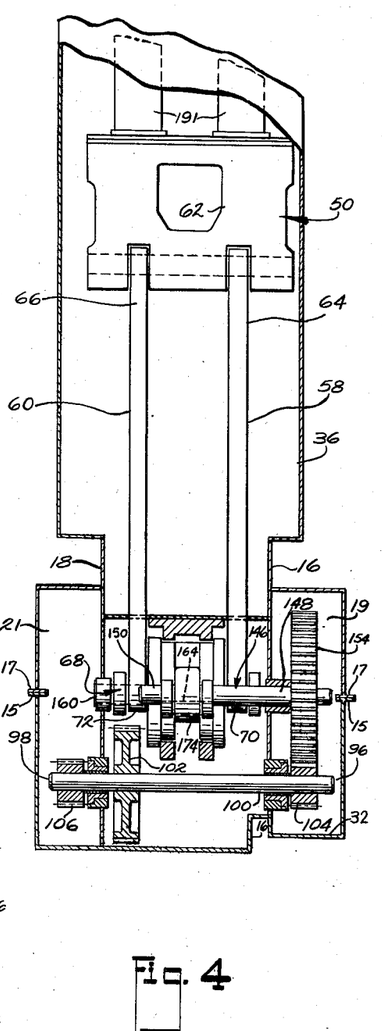
Figure 4 is a section taken substantially along the line 4—4 of Figure 2.

A pair of slide operating links 40 and 42 (Figure 3) are pivotally secured at their upper ends 44 and 46 respectively to one side 48 of the slide 50, and at their lower ends 52 and 54 respectively to an operating link rockshaft 56. A second pair of operating links 58 and 60 (Figure 4) are pivotally secured to the opposite side 62 of the slide 50 at their upper ends 64 and 66 respectively and are pivotally secured to an operating link rockshaft 68 at their lower ends 70 and 72 respectively. Arcuate movement of operating link rockshafts 56 and 68 will cause corresponding pairs of operating links to reciprocate vertically within the side members 34 and 36 respectively of the press, thereby actuating the slide 50 as will be set forth in more detail hereinafter. As will be explained later, the rockshafts 56 and 68 rotate in opposite directions and equalize the side thrust imparted to the links.

The mechanism for driving these operating links is disposed in a pit 30 (Figure 2) below the floor line 28 of the press room as aforesaid and comprises an electric motor 74 pivotally secured to the base 10 of the press by a pivotal connection 76 and a motor adjusting turnbuckle 78 integrally secured to the side 12 of the base for adjusting the tension in the belt drive means 80. The opposite ends 82 and 84 of a flywheel or main drive shaft 86 (Figures 1 and 3) are mounted in journals carried by the bed walls 16 and 18 respectively. A flywheel 88 is idly mounted on the main drive shaft 86 for engagement with a clutch and brake unit 90 (Figures 3 and 8) slidably splined to the main drive shaft 86 so as to engage alternately the flywheel 88 with the clutch or the base front wall 16 with the brake. V-belt means 80 drivingly connect the motor 74 to the flywheel 88 whereby engagement of the flywheel with the clutch will rotate the flywheel together with the main drive shaft 86.

Figure 8:
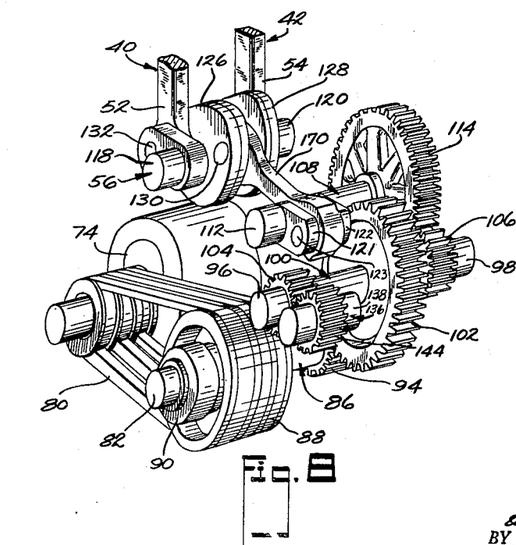
Figure 8 is a fragmentary perspective view of the drive mechanism shown in Figures 1, 2 and 7.

Adjacent the end 84 of the main drive shaft 86 (Figure 3) a main drive pinion 94 is keyed thereto. The opposite ends 96 and 98 of an idler drive shaft 100 (Figures 3, 7 and 8) are journaled in walls 16 and 18 respectively of the base 10 and an idler gear 102 is keyed to this shaft between its opposite ends, so that it is driven by main drive pinion 94. A pair of idler pinions 104 and 106 are keyed on opposite sides of the idler gear 102 adjacent corresponding opposite ends 96 and 98 of the idler drive shaft 100. A bull gear crankshaft 108 (Figures 7 and 8) is journaled on one end 110 (Figures 3 and 7) in the rear wall 18 of the base and on the other end 112 (Figure 7) in a saddle 113 (shown sectioned) intermediate base walls 16 and 18. Bull gear crankshaft 108 carries a bull gear 114 keyed to this crankshaft for meshed engagement with idler pinion 106 (Figure 8).

The operating link rockshaft 56 (Figure 7) is laterally spaced from the bull gear crankshaft 108, is adjacent and parallel to side wall 12, and has opposite ends 118 and 120 journaled in walls 16 and 18 of the base 10.

The bull gear crankshaft 108 has a crank comprising cheeks 121 and 122 and crank pin 124.

The operating link rockshaft 56 in turn comprises eccentrics or cheeks 126 and 128 and a crank pin 130. A pair of rock pins 132 and 134 are angularly displaced approximately 120° from crank pin 130 (Figure 2) and support the lower ends 52 and 54 of operating links 40 and 42 respectively.

Figure 2:
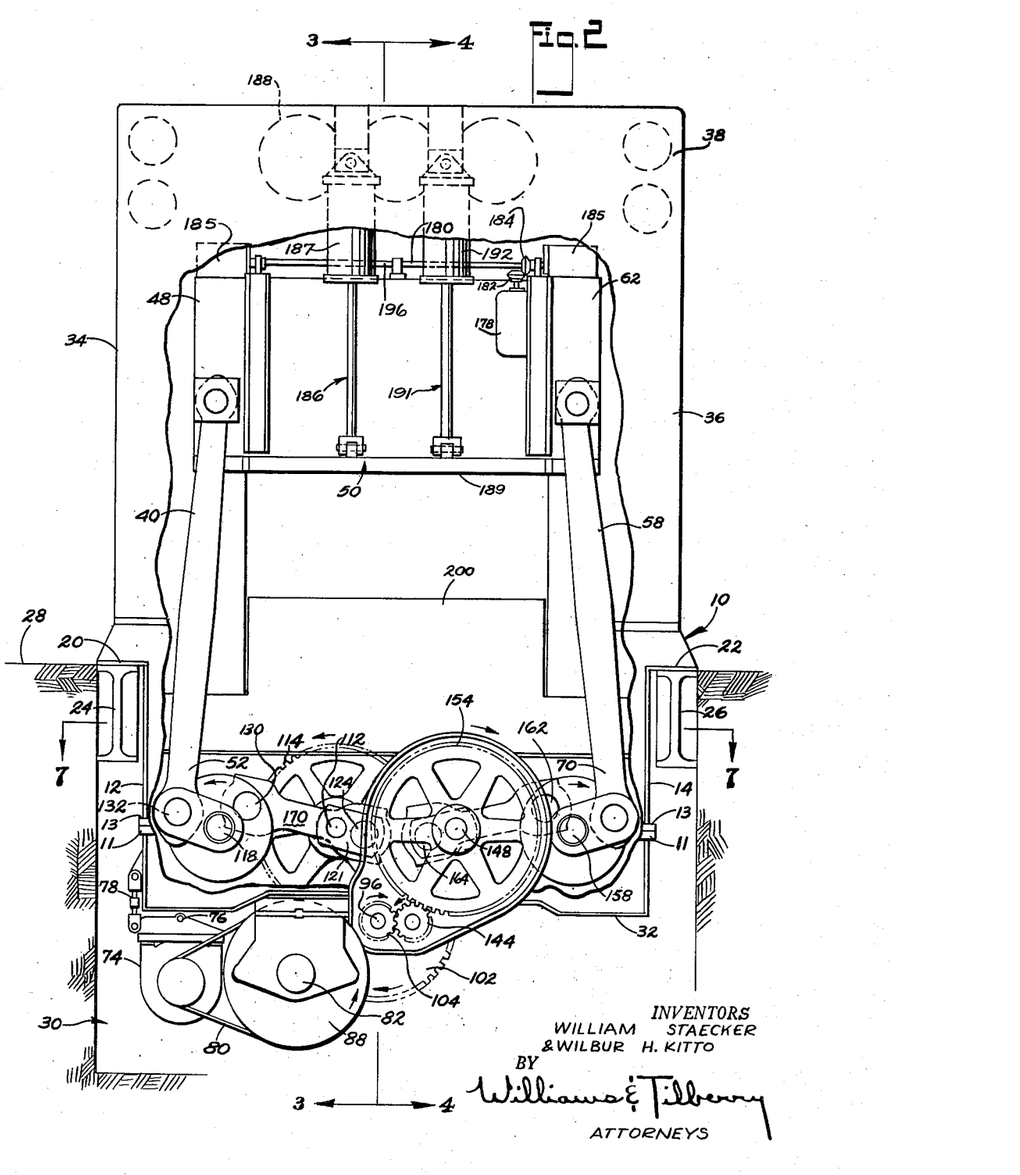
Figure 2 is a front elevation of an underdriven single action press embodying the present invention in which a portion is broken away better to show the slide driving mechanism when the slide is at top dead center.
Figure 5:
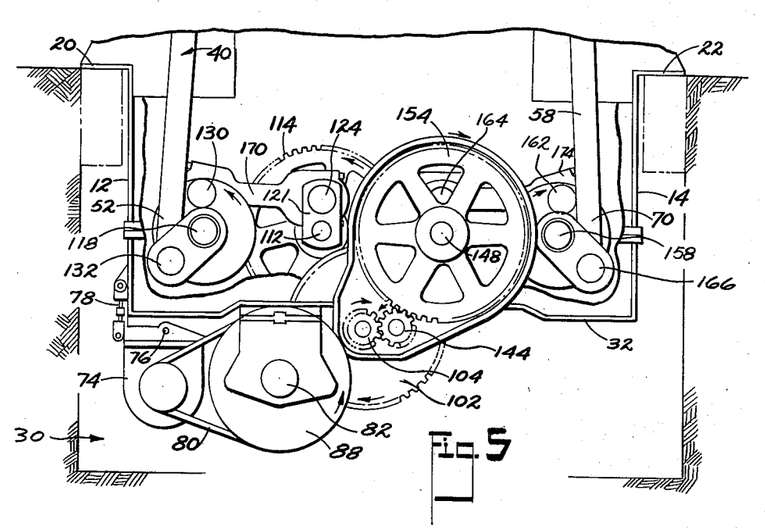
Figure 5 is a fragmentary front elevation similar to Figure 2 showing in detail the bed and the slide driving mechanism and the lower portions of the operating links when the slide is nearing the bottom of its stroke.

A reversing gear stub shaft 136 (Figures 7 and 8) having one end 138 journaled in bed wall 16 carries a reversing pinion 144 positioned for meshed engagement with pinion 104. A second bull gear crankshaft 146 (Figure 7), having one end 148 journaled in wall 16 and its opposite end 150 journaled in a saddle 152 (shown sectioned) between walls 16 and 18, has keyed thereon a second bull gear 154 positioned for meshed engagement with reversing pinion 144 just described (Figures 2 and 5). A second operating link rockshaft 68 (Figure 7), having ends 158 and 160 journaled in walls 16 and 18, has a crank pin 162 aligned with the crank pin 164 of said second bull gear crankshaft 146. Said second operating link rockshaft 68 also has a pair of rock pins 166 and 168 extending oppositely from said crank pin 162 and angularly displaced approximately 120° therefrom. Rockshaft 68 is thus similar to rockshaft 56.

The bull gear crankshafts 108 and 146 and the rockshafts 56 and 68 are connected together respectively as follows: A connecting rod 170 is pivotally secured at one end to crank pin 124 of bull gear crankshaft 108 and at its opposite end to crank pin 130 of operating link rockshaft 56. A second connecting rod 174 has one end pivotally secured to the crank pin 164 of the second bull bear crankshaft 146 and its opposite end pivotally secured to the crank pin 162 of the second operating link rockshaft 68. As stated above, the rockshafts 56 and 68 rotate in opposite directions, this due to the action of reversing pinion 144 which drives crankshaft 146 in the opposite direction to crankshaft 108.

From the foregoing, it may be seen that upon energizing the electric motor 74, the flywheel 88 is rotated idly upon the main drive shaft 86. When the clutch of the clutch and brake unit 90, which is splined on the main drive shaft 86 for axial movement relative thereto, is made to engage the rotating flywheel, it will be evident that the main drive shaft is then coupled with the flywheel and caused to rotate. The main drive shaft pinion 94 rotating counterclockwise causes the idler gear 102, shaft 100 and gears 104 and 106 to rotate clockwise (Figure 2). The bull gear 114, by virtue of being in meshed engagement with the pinion 106 is rotated in a counterclockwise direction, together with the crankshaft 108, thereby moving the connecting rod 170 which rocks the operating link rockshaft 56. By inserting the reversing pinion 144 in meshed engagement with pinion 104, a similar kinematic chain may be traced from the idler gear 102 through to the operating link rockshaft 68. Accordingly, operating links 40—42 and 58—60 respectively are caused to reciprocate vertically in unison within said side members 34 and 36 so as to reciprocate the slide up and down.

The press is designed to have the slide pulled downwardly toward the bolster by means of the pairs of operating links, but the return of the slide upwardly to the top of the stroke is assisted by pairs of piston rods 186 and 191 (Figure 2) which connect to pistons slidable in respective pairs of pneumatic cylinders 187 and 192. The pistons are actuated by compressed air supplied to the underside of the pistons from surge tanks 188 located in the crown of the press. Since this is a common system used on presses of this type and well understood by those skilled in the art, further detailed discussion of the cylinder and surge tank system is not deemed to be necessary.

The lower die face of the slide is vertically adjustable with respect to the body of the slide by means of an adjusting motor 178 (Figure 2) carried by the slide and drivingly connected to adjusting shaft means 196 through suitable bevel gears 184. The adjusting shaft means 196 are in turn drivingly connected at four points to slide adjusting heads 185 which through suitable connections (not shown) are adapted to raise or lower the die face portion 189 of the slide 50 as desired to locate accurately an upper die secured to the slide 50 with respect to a lower die fastened to the bolster 200. This means of adjusting a slide is also well understood by those skilled in the art and therefore is not described in greater detail.

Figure 9:
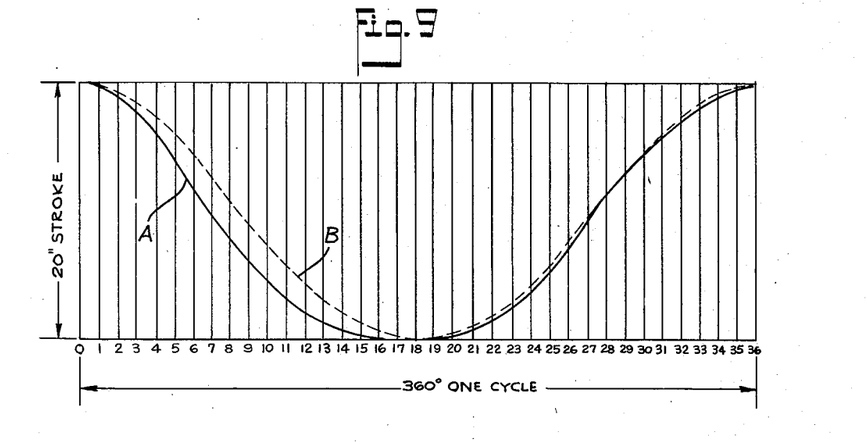
Figure 9 is a plotted graph showing the stroke pattern of the slide of the link type underdriven press compared to that of an eccentric type underdriven press taken at 10° intervals during a 360° cycle.
Figure 10:
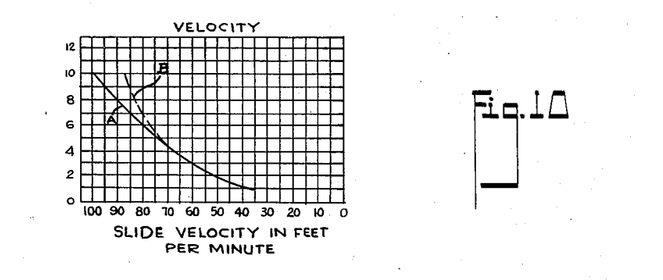
Figure 10 is a chart similar to that of Figure 9 in which the position of the slide in inches above the bottom of the stroke is plotted against the slide velocity in feet per minute.
Figure 11:
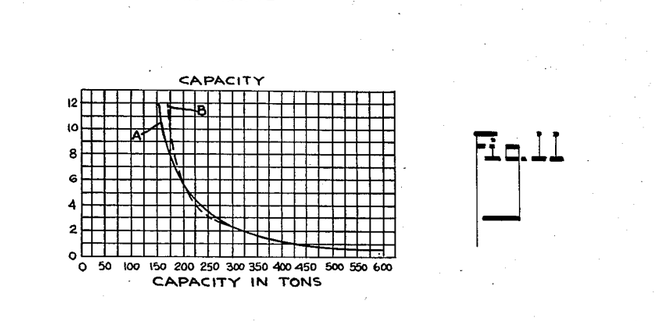
Figure 11 is a chart similar to that of Figure 10 in which the position of the slide in inches above the bottom of the stroke is plotted against the capacity of the press in tons.

The graphs shown in Figures 9, 10 and 11 have been provided to compare the operating characteristics of a press embodying the present invention with those of an eccentric or simple crank driven press. In each graph the solid line indicated by A represents the operating characteristics of the press illustrated in the drawings. The curve B represents the characteristics of a single link press in which a single eccentric or crank is connected with the slide by a link pivoted at one end to the slide and the other end directly to the eccentric or crankshaft.

Figure 6:
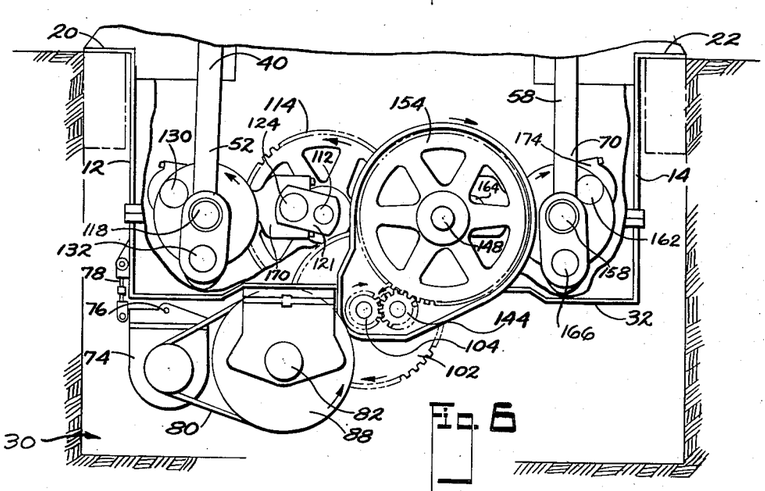
Figure 6 is a fragmentary front elevation similar to Figure 5 showing in detail the slide driving mechanism and the lower portions of the operating links when the slide is at the bottom of its stroke.

Figure 9 illustrates a complete cycle of operation of a press with the stroke of the slide shown as beginning at zero and extending through 360° from its uppermost position as shown in Figure 2 to its lowermost position (shown just being approached in Figure 6) where the slide is closest to the bolster and then back to the starting position. The stroke of the slide as shown in this curve is 20 inches. Reference to Figure 9 illustrates how the slide moves downwardly with the speed characteristics of curve A faster during the initial part of the stroke than does the eccentric driven press shown by curve B. At the time the slide approaches the bolster, the various linkages described hereinabove cause the curve A to flatten out and provide a dwell from approximately 160° to 200° of the slide motion. It will be seen by reference to curve B that the eccentric type of press has a negligible dwell before the slide begins its return stroke. The return stroke of the slide (curve A) approximates the motion of the eccentric press (curve B) referred to until its initial position is reached.

In Figure 10 the velocity of the slide in feet per minute is plotted against the position of the slide in inches above the bottom of its stroke as the slide moves toward the bolster. The curves are drawn to show the down velocity of the slide from a point 10 inches above bottom dead center to dead center. It will be seen that the velocity of the single link press (curve B) 10 inches above bottom dead center is approximately 82 feet per minute while the velocity of a press (curve A) embodying the present invention is close to 100 feet per minute.

Figure 11 illustrates the load capacity of the press in tons plotted against the position of the slide in inches above the bottom of the stroke, the curve illustrating characeristics beginning on the down stroke 12 inches above bottom dead center. As might be expected from the showing of Figure 10, the press drive as shown by the line A has a capacity somewhat less than the reference press shown in the line B of Figure 11. Line A shows a capacity of approximately 150 tons at the 12 inch point as against greater capacity in the press of line B of about 25 tons, line B showing at 12 inches a capacity of approximately 175 tons.

It is to be understood that the form of this invention herewith shown and described is to be taken as a preferred example of the same and that various changes in the shape, size and arrangements of parts may be resorted to without departing from the invention or the scope of subjoined claims.

We claim:

1. A drive mechanism for a press slide including a bull gear shaft having a throw portion, a bull gear mounted on said bull gear shaft, a drive shaft supported for rotation with its axis parallel to said bull gear shaft, a pinion on said drive shaft in engagement with said bull gear, means to rotate said drive shaft, a rock shaft having its axis parallel to said bull gear shaft and having angularly offset throw portions, a connecting rod extending from the throw portion of said crank shaft to one of said throw portions of the said rock shaft, and an operating link extending from the other throw portion of said rock shaft to said press slide.

2. The drive mechanism set forth in claim 1 wherein said means to rotate said drive shaft include a main drive shaft having an axis of rotation parallel to said first mentioned drive shaft, a flywheel mounted on said main drive shaft, a pinion mounted on said main drive shaft, and an idler gear secured to said first mentioned drive shaft for engagement with said main drive shaft pinion.

3. A drive mechanism for a press slide comprising: a pair of bull gear crankshafts having throw portions; a pair of bull gears mounted on said bull gear crankshafts; a drive shaft supported for rotation with its axis parallel to said crankshafts; pinion means integrally secured to said drive shaft in driving engagement with one of said bull gears; reversing pinion means in driving engagement between said first mentioned pinion means and the other of said bull gears, whereby said bull gears and bull gear crank shafts are adapted to be rotated in opposite directions by said drive shaft; a pair of rock shafts; means for rotatably supporting said rock shafts adjacent respective crankshafts with their axes parallel thereto, each of said rock shafts having angularly offset throw portions; a connecting rod extending from the throw portion of one of said crank shafts to one of said throw portions of the rockshaft adjacent thereto; a connecting rod extending from the throw portion of the other of said crank shafts to one of said throw portions of the other of said crank shafts to one of said throw portions of its adjacent rock shaft; and operating links extending from the other throw portions of said rock shafts to said press slide.

4. Drive mechanism for a press slide comprising a pair of bull gear crankshafts, means for rotatably supporting said crankshafts with their axes parallel, said crankshafts having throw portions, a bull gear mounted on one of said crankshafts, a second bull gear mounted on the other of said crankshafts, a drive shaft supported for rotation with its axis parallel to said crankshafts, a pinion on said drive shaft in engagement with one of said bull gears, a second pinion on said drive shaft, a reversing pinion interposed between and in engagement with said second pinion and said second bull gear whereby said bull gears and crankshafts are adapted to be rotated in opposite directions by said drive shaft, a pair of rockshafts, means for rotatably supporting said rockshafts respectively outwardly from said crankshafts and with their axes parallel thereto, each of said rockshafts having angularly offset throw portions, a connecting rod extending from the throw portion of one of said crankshafts to one of said throw portions of the rockshaft disposed outwardly therefrom, a second connecting rod extending from the throw portion of the other crankshaft to one of said throw portions of the other rockshaft, and operating links extending from the other throw portions of said rockshafts to said press slide.

5. Drive mechanism for a press slide comprising a pair of bull gear crankshafts, means for rotatably supporting said crankshafts with their axes parallel, said crankshafts having throw portions, a bull gear mounted on one of said crankshafts, a second bull gear mounted on the other of said crankshafts, a drive shaft supported for rotation with its axis parallel to said crankshafts, a pinion on said drive shaft in engagement with one of said bull gears, a second pinion on said drive shaft, a reversing pinion interposed between and in engagement with said second pinion and said second bull gear whereby said bull gears and crankshafts are adapted to be rotated in opposite directions by said drive shaft, a pair of rockshafts, means for rotatably supporting said rockshafts respectively outwardly from said crankshafts and with their axes parallel thereto, each of said rockshafts having a center throw portion and a pair of outboard throw portions angularly offset relative to the center throw portion, a connecting rod extending from the throw portion of one of said crankshafts to the center throw portion of the rockshaft disposed outwardly therefrom, a second connecting rod extending from the throw portion of the other crankshaft to the center throw portion of the other rockshaft, and operating links extending from each of said outboard throw portions of said rockshafts to said press slide.

6. Drive mechanism for a press slide comprising a pair of bull gear crankshafts, means for rotatably supporting said crankshafts with their axes parallel and substantially horizontal, said crankshafts having throw portions disposed in alignment whereby corresponding parts of said throw portions rotate in substantially the same vertical plane, said axes of said crankshafts being spaced apart a distance greater than the length of said throw portions whereby said crankshafts may rotate without interference between said throw portions, a bull gear mounted at one end of one of said crankshafts, a second bull gear mounted at the opposite end of the other of said crankshafts, a drive shaft supported for rotation with its axis parallel to said crankshafts, a pinion on said drive shaft in engagement with one of said bull gears, a second pinion on said drive shaft, a reversing pinion interposed between and in engagement with said second pinion and said second bull gear whereby said bull gears and crankshafts are adapted to be rotated in opposite directions by said drive shaft, a pair of rockshafts, means for rotatably supporting said rockshafts respectively outwardly from said crankshafts and with their axes parallel thereto, each of said rockshafts having angularly offset throw portions, a connecting rod extending from the throw portion of one of said crankshafts to one of said throw portions of the rockshaft disposed outwardly therefrom, a second connecting rod extending from the throw portion of the other crankshaft to one of said throw portions of the other rockshaft, and operating links extending from the other throw portions of said rockshafts to said press slide.

7. Drive mechanism for a press slide comprising a pair of bull gear crankshafts, means for rotatably supporting said crankshafts with their axes parallel and substantially horizontal, said crankshafts having throw portions disposed in alignment whereby corresponding parts of said throw portions rotate in substantially the same vertical plane, said axes of said crankshafts being spaced apart a distance greater than the length of said throw portions whereby said crankshafts may rotate without interference between said throw portions, a bull gear mounted at one end of one of said crankshafts, a second bull gear mounted at the opposite end of the other of said crankshafts, a drive shaft supported for rotation with its axis parallel to said crankshafts, a pinion on said drive shaft in engagement with one of said bull gears, a second pinion on said drive shaft, a reversing pinion interposed between and in engagement with said second pinion and said second bull gear whereby said bull gears and crankshafts are adapted to be rotated in opposite directions by said drive shaft, a pair of rockshafts, means for rotatably supporting said rockshafts respectively outwardly from said crankshafts and with their axes parallel thereto, each of said rockshafts having a center throw portion and a pair of outboard throw portions angularly offset relative to the center throw portion, a connecting rod extending from the throw portion of one of said crankshafts to the center throw portion of the rockshaft disposed outwardly therefrom, a second connecting rod extending from the throw portion of the other crankshaft to the center throw portion of the other rockshaft, and operating links extending from each of said outboard throw portions of said rockshafts to said press slide.

8. Drive mechanism for a press slide comprising a pair of bull gear crankshafts, means for rotatably supporting said crankshafts with their axes parallel and substantially horizontal, said crankshafts having substantially identical throw portions disposed in alignment whereby corresponding parts of said throw portions rotate in substantially the same vertical plane, said axes of said crankshafts being spaced apart a distance greater than the length of said throw portions whereby said crankshafts may rotate without interference between said throw portions, a bull gear mounted at one end of one of said crankshafts, a second bull gear mounted at the opposite end of the other of said crankshafts, the diameters of said bull gears being the same and greater than the spacing between the axes of said crankshafts whereby said bull gears are in overlapping relation to each other, a drive shaft supported for rotation with its axis parallel to said crankshafts, a pinion at one end of said drive shaft in engagement with one of said bull gears, a second pinion at the other end of said drive shaft, a reversing pinion interposed between and in engagement with said second pinion and said second bull gear whereby said bull gears and crankshafts are adapted to be rotated in opposite directions by said drive shaft, a pair of rockshafts, means for rotatably supporting said rockshafts respectively outwardly from said crankshafts and with their axes parallel thereto, each of said rockshafts having a center throw portion and a pair of outboard throw portions angularly offset relative to the center throw portion, a connecting rod extending from the throw portion of one of said crankshafts to the center portion of the rockshaft disposed outwardly therefrom, a second connecting rod extending from the throw portion of the other crankshaft to the center throw portion of the other rockshaft, and operating links extending from each of said outboard throw portions of said rockshafts to said press slide.

9. Drive mechanism for a press slide comprising a pair of bull gear crankshafts, means for rotatably supporting said crankshafts with their axes parallel and substantially horizontal, said crankshafts having substantially identical throw portions disposed in alignment whereby corresponding parts of said throw portions rotate in substantially the same vertical plane, said axes of said crankshafts being spaced apart a distance greater than the length of said throw portions whereby said crankshafts may rotate without interference between said throw portions, a bull gear mounted at one end of one of said crankshafts, a second bull gear mounted at the opposite end of the other of said crankshafts, a main drive shaft supported for rotation with its axis parallel to said crankshafts, a pinion on said main drive shaft, an idler drive shaft, an idler gear on said idler drive shaft, a pinion at one end of said idler drive shaft in engagement with one of said bull gears, a second pinion at the other end of said idler drive shaft, a reversing pinion interposed between and in engagement with said second pinion and said second bull gear whereby said bull gears and crankshafts are adapted to be rotated in opposite directions, a pair of rockshafts, means for rotatably supporting said rockshafts respectively outwardly from said crankshafts and with their axes parallel thereto, each of said rockshafts having a center throw portion and a pair of outboard throw portions angularly offset relative to the center throw portion, a connecting rod extending from the throw portion of one of said crankshafts to the center throw portion of the rockshaft disposed outwardly therefrom, a second connecting rod extending from the throw portion of the other crankshaft to the center throw portion of the other rockshaft, and operating links extending from each of said outboard throw portions of said rockshafts to said press slide.

10. An underdriven press comprising a base, a crown, side members for supporting said crown from said base, a slide arranged above said base for sliding contact with said side members, a pair of aligned double throw operating link rockshafts journaled in opposite sides of said base, pairs of operating links pivotally secured at their lower ends to said rockshafts and extending upwardly therefrom for pivotal attachment to said slide, a pair of single throw crankshafts journaled in said base and having the crank portions thereof lying in substantially the same vertical plane, a pair of connecting rods connecting said rockshafts to respective crankshafts, and means for rotating said crankshafts in opposite directions including a bull gear secured to the outboard end of each of said single throw crankshafts, the diameters of said bull gears being greater than the spacing between the axes of said single throw crankshafts, said bull gears lying in overlapping relation one with the other, a main drive shaft rotatably supported beneath said single throw crankshafts and parallel thereto, an idler drive shaft lying intermediate said single throw crankshafts and said drive shaft and with its axis parallel thereto and on a vertical plane extending between said crankshafts, gear means drivingly connecting said main drive shaft to one of said bull gears, and gear means drivingly connecting said drive shaft to the other of said bull gears, said last named gear means including a reversing pinion in meshed engagement with said other bull gear.

11. The mechanism set forth in claim 10, wherein the gear means includes a pinion secured to said main drive shaft, an idler gear secured to said idler shaft and in engagement with said main drive shaft pinion, pinions secured to said idler drive shaft on opposite sides of said idler gear, one of said idler drive shaft pinions being disposed in driving engagement with one of said bull gears, and a reversing pinion in meshed engagement with the other of said idler drive shaft pinions and the other of said bull gears.

12. The press set forth in claim 10 wherein said base comprises integrally secured front, rear and side walls, the opposite ends of said operating link rockshafts being journaled in said front and rear walls respectively, one of said crankshafts having one end journaled in said rear wall and the opposite end journaled in a pillow block bearing intermediate said front and rear walls, and the other of said crankshafts having one end journaled in said front wall and the opposite end journaled in a pillow block bearing intermediate said front and rear walls.

13. The press set forth in claim 10, wherein said base is liquid tight and oil filled, and a flywheel is idly mounted on said main drive shaft.

14. In an underdriven press including a base, a crown, a side member on each side of said base for supporting said crown from said base, a slide arranged above said base and between said side members, first and second pairs of slide operating links adjacent opposite side members, extending from said base to said slide and pivotally secured thereto, the improvement in press driving mechanism comprising a motor secured to said base, a main drive shaft journaled in said base, a flywheel idly carried on said main drive shaft, a clutch and brake unit slidingly splined on said main drive shaft for alternative engagement with said flywheel and said base, a belt means drivingly connecting said motor to said flywheel, a first pinion secured on said main drive shaft, an idler drive shaft journaled in said base parallel to said main drive shaft, an idler gear secured on said idler drive shaft for meshed engagement with said first pinion, second and third pinions secured on said idler drive shaft on opposite sides of said idler gear, said second pinion being remote from said flywheel, a first crankshaft journaled in said base parallel to said idler drive shaft, a first bull gear secured on said first crankshaft for meshed engagement with said second pinion, a first operating link rockshaft journaled in said base parallel to said first crankshaft, a first connecting rod pivotally secured at opposite ends to crank pins on said first crankshaft and said first rockshaft respectively, the lower ends of said first pair of slide operating links being pivotally secured to said first operating link rockshaft on rock pins angularly displaced from said first connecting rod crank pin, a reversing pinion shaft journaled in said base, a reversing pinion secured on said reversing pinion shaft for meshed engagement with said third pinion, a second crankshaft journaled in said base parallel to said idler drive shaft, a second bull gear secured on said second crankshaft for meshed engagement with said reversing pinion, a second operating link rockshaft journaled in said base parallel to said second crankshaft, a second connecting rod pivotally secured at opposite ends to crank pins on said second rockshaft and said second crankshaft respectively, the lower ends of said second pair of operating links being pivotally secured to said second operating link rockshaft on rock pins angularly displaced from said second connecting rod crank pin, whereby rocking of said operating link rockshafts reciprocates said pairs of operating links to provide vertical actuation of said slide.

References Cited in the file of this patent

UNITED STATES PATENTS

| | | |
|---|---|---|
| 1,407,161 | Klocke | Feb. 21, 1922 |
| 2,503,037 | Georgeff | Apr. 4, 1950 |